United States Patent [19]

Wang et al.

[11] Patent Number: 5,780,582
[45] Date of Patent: Jul. 14, 1998

[54] HYDROXY-FUNCTIONALIZED POLYESTER AND POLY(ESTER ETHER) OLIGOMERS

[75] Inventors: David S. Wang, Lake Jackson, Tex.; Michael N. Mang, Midland, Mich.; Jerry E. White; John M. Beckerdite, both of Lake Jackson, Tex.

[73] Assignee: The Dow Chemical Company, Midland, Mich.

[21] Appl. No.: 775,657

[22] Filed: Dec. 31, 1996

[51] Int. Cl.$^6$ .................................................. C08G 59/00
[52] U.S. Cl. .................................. 528/365; 528/366
[58] Field of Search ................................. 528/365, 366

[56] References Cited

U.S. PATENT DOCUMENTS

| | | | |
|---|---|---|---|
| 4,191,714 | 3/1980 | Yonezawa et al. | 525/102 |
| 5,171,820 | 12/1992 | Mang et al. | 528/87 |
| 5,391,652 | 2/1995 | Wang et al. | 525/533 |
| 5,496,910 | 3/1996 | Mang et al. | 528/88 |

*Primary Examiner*—Terressa Mosley

[57] ABSTRACT

Hydroxy-functional polyester oligomers are prepared by contacting a hydroxy-functional aliphatic dicarboxylic acid or a mixture of dicarboxylic acids containing hydroxy-functional aliphatic diacids, with a diglycidyl ether or diglycidyl ester in the presence of an onium catalyst in an ether solvent under conditions suitable for forming the oligomer. The oligomers can be used as hot melt adhesives, adhesive tackifiers, plasticizers, heat-curable adhesives and heat-curable coatings. Some of these materials are biodegradable and are therefore suitable for application to compostable end products.

19 Claims, No Drawings

HYDROXY-FUNCTIONALIZED POLYESTER AND POLY(ESTER ETHER) OLIGOMERS

BACKGROUND OF THE INVENTION

This invention relates to polyester oligomers and the processes for preparing the same.

Oligomers are combinations of monomers giving chains of less than 15,000 $M_n$ and a $M_w/M_n$ ranging from 1 to 100 as determined by size exclusion chromatography using polystyrene calibration standards. They are utilized as they are, or as an intermediate product by introducing various functional groups to activate them, as, for example, as surfactants, paints, adhesives, sealants, printing inks and the like. As for polyester oligomers, it has already been known that the properties thereof when used as coated films, such as adhesiveness, strength, oil and solvent resistance, can be improved by introducing silicon radicals capable of being hydrolyzed into Si—O—C bond in the alkyd resin to be modified, as described in U.S. Pat. No. 4,191,714.

The present invention provides polyester oligomers which do not require the introduction of silicon radicals or other functional groups into their molecules to improve such properties.

SUMMARY OF THE INVENTION

In one aspect, the present invention is a hydroxy-functional polyester oligomer comprising moieties derived from hydroxy-functional aliphatic diacids and diglycidyl ethers or diglycidyl esters.

In another aspect, this invention is a process for preparing a hydroxy-functional polyester oligomer which comprises contacting a hydroxy-functional aliphatic dicarboxylic acid or a mixture of dicarboxylic acids containing hydroxy-functional aliphatic diacids, with a diglycidyl ether or diglycidyl ester in the presence of an onium catalyst in an ether solvent under conditions suitable for forming the oligomer.

The poly(hydroxy ester) and poly(hydroxy ester ether) oligomers of the present invention can be used as hot melt adhesives, adhesive tackifiers, plasticizers, heat-curable adhesives and heat-curable coatings. Some of these materials are biodegradable and are therefore suitable for application to compostable end products.

DETAILED DESCRIPTION OF THE INVENTION

Definitions

The following terms are used in this application and have the meanings and preferred embodiments set out hereinafter unless otherwise specified.

The term "hydrocarbylene" means a divalent aliphatic hydrocarbon moiety such as alkylene, alkenylene or cycloalkylene having from 2 to 20 carbons and optionally containing a heteroatomic group, such as oxygen, sulfur, imino, or sulfonyl.

As used herein, the term "aromatic moiety" means any group having one or more aromatic rings and from about 5 to about 25 carbon atoms. The aromatic rings may have one or more non-carbon atoms in the ring such as, for example, sulfur, nitrogen and oxygen, or one or more substituent groups bonded to the aromatic ring. These substituent groups may be alkyl, cycloalkyl, aryl, alkoxy, aryloxy, amido, halo, nitro, or cyano groups, carboxyl, carbonyl or sulfoxyl, in the chain or substituent thereto.

The term "diglycidyl ether" means a compound generally represented by the formula:

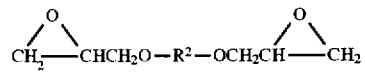

wherein $R^2$ is an aromatic moiety or a hydrocarbylene.

The term "diglycidyl ester" means a compound generally represented by the formula:

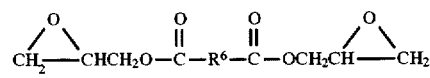

The polyester or poly(ester ether)oligomer of the present invention has repeating units represented by the formula:

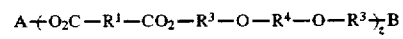

wherein z has a value of 10 or less; $R^1$ is a divalent organic moiety which is primarily hydrocarbon; $R^3$ is:

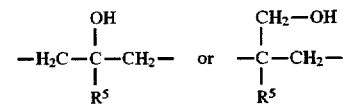

and $R^4$ is:

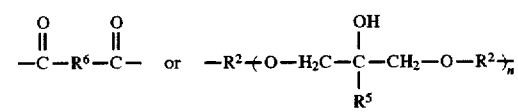

wherein $R^2$ and $R^6$ are independently divalent organic moieties which are primarily hydrocarbon; $R^5$ is hydrogen or alkyl; n is from 0 to 100; A is independently hydrogen,

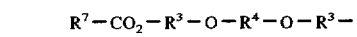

or

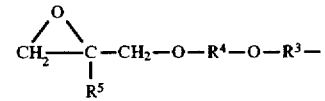

wherein $R^7$ is a monovalent organic moiety which is primarily hydrocarbon; $R^3$, $R^4$ and $R^5$ are as previously defined; and B is independently:

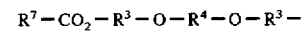

or

-continued

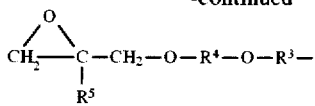

wherein $R^3$, $R^4$, $R^5$ and $R^7$ are as previously defined.

In the preferred polymers, $R^1$, $R^2$ and $R^6$ are independently alkylene, cycloalkylene, alkylenearylene, alkyleneoxyalkylene, poly(alkyleneoxyalkylene), alkyleneamidealkylene, poly(alkyleneamidealkylene), alkylenethioalkylene, poly(alkylenethioalkylene), alkylenesulfonylalkylene, poly(alkylenesulfonylalkylene), arylene, dialkylenearylene, diaryleneketone, diarylenesulfone, diarylene oxide, alkylidene-diarylene, diarylene sulfide, or a combination of these moieties, optionally substituted with at least one hydroxyl group.

In the more preferred polymers, $R^1$ is ethylene, propylene, butylene, pentamethylene, hexamethylene, heptamethylene, octamethylene, nonamethylene, decamethylene, dodecamethylene, 1,4-cyclohexylene, 1,3-cyclohexylene or 1,2-cyclohexylene, optionally substituted with at least one hydroxyl group; $R^2$ and $R^6$ are independently methylene, ethylene, propylene, butylene, pentamethylene, hexamethylene, heptamethylene, octamethylene, nonamethylene, decamethylene, dodecamethylene, 1,4-cyclohexylene, 1,3-cyclohexylene or 1,2-cyclohexylene, optionally substituted with at least one hydroxyl group More preferably, $R^1$ and $R^6$ are represented by the formula:

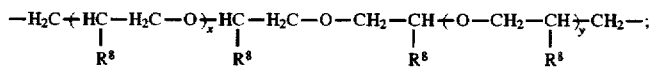

and $R^2$ is represented by the formula:

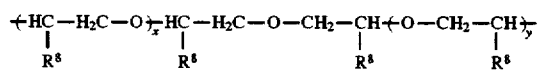

wherein $R^8$ is independently hydrogen or methyl and x and y are independently 0–100.

In the most preferred polymers, $R^1$ and $R^6$ are independently m-phenylene, p-phenylene or 2,6-napthalene; $R^2$ is independently m-phenylene, p-phenylene, naphthylene, diphenylene-isopropylidene, sulfonyldiphenylene, carbonyldiphenylene, oxydiphenylene or 9,9-fluorenediphenylene; $R^5$ is hydrogen; $R^7$ is independently phenyl, methyl, or:

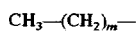

wherein m is 1–30; A is hydrogen or:

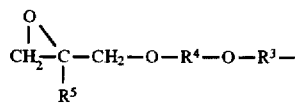

and B is

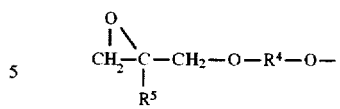

wherein $R^3$, $R^4$ and $R^5$ are as previously defined.

Generally, the oligomers of the present invention can be prepared by reacting dicarboxylic acids and diglycidyl ethers or diglycidyl esters at conditions sufficient to yield hydroxy ester ether or hydroxy ester linkages.

The conditions at which the polymerization reaction is most advantageously conducted are dependent on a variety of factors, including the specific reactants, solvent, and catalyst employed, if any. In general, the reaction is conducted under a non-oxidizing atmosphere such as a blanket of nitrogen or other inert gases. The reaction can be conducted neat (without solvent or other diluents). However, in order to ensure homogeneous reaction mixtures and to moderate exothermic reactions at such temperatures, it is often desirable to use inert organic solvents, such as those mentioned previously, for the reactants.

The time and temperature most advantageously employed will vary depending on the specific monomers employed, particularly their reactivity, the specific oligomer, and the organic liquid. In general, the reaction temperature to form the oligomers is from about 80° C. to about 300° C. and, most preferably, from about 100° C. to about 180° C., and for a time of from about 5 minutes to about 24 hours, more preferably from about 15 minutes to about 8 hours and, most preferably, from about 30 minutes to about 4 hours.

The concentrations at which the monomers are most advantageously employed in the organic liquid reaction medium are dependent on a variety of factors including the specific monomers and organic liquid employed and the polymer being prepared. In general, the monomers are employed in an acid to epoxy stoichiometric ratio of from about 0.5:1 to about 2:1 preferably at a 0.8:1 to 1.2:1 ratio. If desired, oligomers prepared with an excess of bis epoxide may be further reacted with monofunctional carboxylic acids. Optionally, the bis epoxide can be concurrently reacted with di- and monofunctional carboxylic acids.

Any inert organic solvent which can dissolve the monomers to the appropriate degree and can be heated to the appropriate polymerization temperature either at atmospheric, subatmospheric or superatmospheric pressure could be used. Examples of suitable solvents include pyridine, triethylamine or mixtures thereof; N-methylpyrrolidinone (NMP), methyl benzoate, ethyl benzoate, butyl benzoate; cyclopentanone, cyclohexanone, cycloheptanone, cyclooctanone, cyclohexylpyrrolidinone; and ethers or hydroxy ethers such as diglyme, triglyme, diethylene glycol ethyl ether, diethylene glycol methyl ether, dipropylene glycol methyl ether, dipropylene glycol dimethyl ether, propylene glycol phenyl ether, propylene glycol methyl ether and tripropylene glycol methyl ether; toluene, mesitylene, xylene, benzene, dipropylene glycol monomethyl ether acetate, halogenated solvents such as dichlorobenzene, propylene carbonate, naphthalene, diphenyl ether, butyrolactone, dimethylacetamide, dimethylformamide and mixtures thereof. The preferred solvents are NMP, butyrolactone and diphenylether.

During monomer synthesis, the monomers are recovered from the reaction mixture by conventional methods. For example, the reaction mixture containing the monomer as a precipitate can be filtered to remove the solid monomer. The solid monomer can then be rinsed with water, methanol, and ether or other solvents which are non-solvents for the monomer, but good solvents for the impurities.

The molecular weight of the oligomer of the present invention may be between about 600 and about 20,000, but it is preferably between about 1,000 and about 10,000 and, still more preferably between about 1,500 and about 6,000. Mixtures of oligomers having molecular weights within these ranges may also be used, for example, a mixture of an oligomer having a molecular weight of 3,000 with one having a molecular weight of 20,000 or a mixture of an oligomer having a molecular weight of 6,000 with one having a molecular weight of 15,000.

The oligomer can be directly cast as a film, applied as a coating, or poured into a non-solvent to precipitate the oligomer. Water, methanol, acetone and other similar polar liquids are typical non-solvents which can be used to precipitate the oligomer. If the oligomer is obtained in solid form, it may be further processed using conventional compression molding techniques or melt spinning, casting or extrusion techniques provided the solid precursor has a sufficiently low glass transition temperature.

More commonly, the oligomer is processed directly from the organic liquid reaction solution and the advantages of the present invention are more fully realized in that instance. Since the oligomer is soluble in the organic liquid reaction medium, the organic solution of the precursor can be cast or applied and the solvent evaporated. Upon evaporation of the solvent, a solid material results.

The following examples are for illustrative purposes only and are not intended to limit the scope of this invention. Unless otherwise indicated, all parts and percentages are by weight.

EXAMPLE 1

A mechanically-stirred mixture of bisphenol A-diglycidyl ether (BADGE; epoxy equivalent weight or eew=179.99; 372.7 g), adipic acid (57.3 g), ethyltriphenyl phosphonium acetate-acetic acid complex (ETPA, 70 percent in methanol; 0.9 g), xylene (56.0 g) and cyclohexanone (84.0 g) under a nitrogen purge is heated to 140° C. over a period of 45 minutes. After an initial exotherm to 175° C., additional adipic acid (90 g), ETPA (0.6 g), xylene (56.0 g) and cyclohexanone (84.0 g) are added and the temperature decreases to about 140° C., after which a second exotherm increases the reaction temperature to 160° C. The mixture then is allowed to air cool to 150° C., and stirring is maintained at that temperature for 75 minutes. After cooling to room temperature, the resulting solution is cast onto a sheet of tin-free steel sheet and baked for 10 minutes at 200° C. to give a coating (about 0.2 mil) which shows no cracking (0 mm) in a wedge-bend test, is unaffected by over 50 methyl ethyl ketone (MEK) double rubs and does not delaminate under pasteurization conditions (121° C.), indicating that the coating has excellent chemical and moisture resistance along with good flexibility. Prior to casting and baking, the oligomeric poly(hydroxy ester ether) formed during the reaction has an eew of 1335 and an acid number of 67.15.

EXAMPLE 2

A stirred mixture of BADGE (eew=179.99; 372.7 g), adipic acid (147.3 g), ETPA (0.914 g), xylene (56 g) and cyclohexanone is heated under nitrogen to 140° C., after which the temperature increases exothermically to 175° C. Additional ETPA (0.6 g), xylene (56 g) and cyclohexanone (84 g) are added, the temperature is allowed to cool to 150° C., and stirring at that temperature is continued for 50 minutes. The resulting solution is cast to give coatings with properties like those described for the coating of Example 1. Prior to casting and baking, the oligomeric poly(hydroxy ester ether) formed during the reaction has an eew of 2342 and an acid number of 28.51.

EXAMPLE 3

A stirred mixture of BADGE (eew=179.99; 344.0 g), adipic acid (56.0 g), ETPA (0.844 g) and methyl isobutyl ketone (MIBK; 80 g) under nitrogen is heated to 140° C., after which the temperature of the reaction rises exothermically to 166° C. Adipic acid (80 g) and ETPA (0.6 g) are added and the temperature decreases to about 140° C. prior to a second exotherm that raises the reaction temperature to 163° C. Additional MIBK (80 g) is added and stirring at about 140° C. is continued for 45 minutes. Acetic acid (36 percent in water; 25.5 g) then is added and the resulting mixture is stirred at 120° C. for 30 minutes, and the solution is diluted with Dowanol™ PM (160 g) and is allowed to cool to room temperature. Coatings, cast from the resulting solution, have properties like those of the coatings of Examples 1 and 2; prior to casting and baking, the oligomeric poly(hydroxy ester ether) formed during the reaction has an eew of 1684 and an acid number of 59.28.

EXAMPLE 4

A mechanically-stirred mixture of BADGE (eew=172, 300 g), malic acid (117 g), acetic acid (99.9 percent, 15 g) and tetrabutylammonium bromide (TBAB; 28 g) is heated under nitrogen and over a period of 45 minutes to 140° C., after which the reaction temperature rises exothermically to about 160° C. when forced air cooling is applied to control the exotherm. The mixture then is allowed to cool to 155° C. and maintained while stirring at that temperature for 4 hours. The resulting oligomeric poly(hydroxy ester ether) has an acid number of 75, an eew of 39,402 and $M_n$ (GPC) of 1511.

EXAMPLE 5

A stirred mixture of BADGE (eew=172; 300 g), benzoic acid (40 g) and TBAB (22.5 g) is heated under nitrogen to 150° C. and maintained at that temperature for one hour. Adipic acid (127.5 g) then is added and the resulting exothermic temperature rises to about 165° C., is controlled by forced air cooling, after which the reaction mixture is stirred at 150° C. for 4 hours. The oligomeric poly(hydroxy ester ether) thus formed has an acid number of 56, an eew of 119.444 and $M_n$ (GPC)=1797.

cyclohexylene, 1,3-cyclohexylene or 1,2-cyclohexylene, optionally substituted with at least one hydroxyl group.

4. The oligomer of claim 2 wherein $R^1$ is represented by the formula:

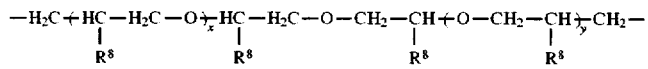

What is claimed is:

1. A polyester or poly(ester ether) oligomer having repeating units represented by the formula:

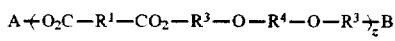

wherein z has a value of 10 or less, $R^1$ is an arylene moiety or an aliphatic moiety having from 1 to 8 carbons; $R^3$ is:

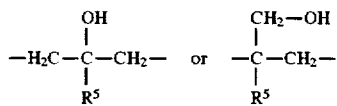

and $R^4$ is:

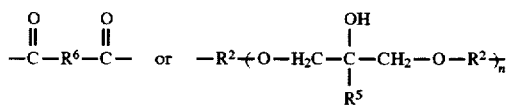

wherein $R^2$ is independently a divalent organic moiety which is primarily hydrocarbon; $R^5$ is hydrogen or alkyl; $R^6$ is an arylene moiety or an aliphatic moiety having from 1 to 8 carbons and n is from 0 to 100; A is hydrogen or:

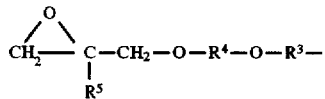

wherein $R^3$, $R^4$ and $R^5$ are as previously defined; and B is:

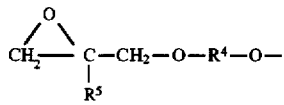

wherein $R^4$ and $R^5$ are as previously defined.

2. The oligomer of claim 1 wherein $R^1$ is independently alkylene, cycloalkylene, alkylenearylene, alkyleneoxyalkylene, poly(alkyleneoxyalkylene), alkyleneamidealkylene, poly(alkyleneamidealkylene), alkylenethioalkylene, poly(alkylenethioalkylene), alkylenesulfonylalkylene, poly(alkylenesulfonylalkylene), arylene, dialkylenearylene, diaryleneketone, diarylenesulfone, diarylene oxide, alkylidene-diarylene, diarylene sulfide, or a combination of these moieties, and optionally substituted with at least one hydroxyl group.

3. The oligomer of claim 2 wherein $R^1$ is independently methylene, ethylene, propylene, butylene, pentamethylene, hexamethylene, heptamethylene, octamethylene, 1,4-

5. The oligomer of claim 2 wherein $R^1$ is independently m-phenylene, p-phenylene or 2,6-napthalene.

6. The oligomer of claim 1 wherein $R^2$ is independently, alkylene, cycloalkylene, alkylenearylene, alkyleneoxyalkylene, poly(alkyleneoxyalkylene), alkyleneamidealkylene, poly(alkyleneamidealkylene), alkylenethioalkylene, poly(alkylenethioalkylene), alkylenesulfonylalkylene, poly(alkylenesulfonylalkylene), arylene, dialkylenearylene, diaryleneketone, diarylenesulfone, diarylene oxide, alkylidene-diarylene, diarylene sulfide, or a combination of these moieties, and optionally substituted with at least one hydroxyl group.

7. The oligomer of claim 6 wherein $R^2$ is independently ethylene, propylene, butylene, pentamethylene, hexamethylene, heptamethylene, octamethylene, nonamethylene, decamethylene, dodecamethylene, 1,4-cyclohexylene, 1,3-cyclohexylene or 1,2-cyclohexylene, optionally substituted with at least one hydroxyl group.

8. The oligomer of claim 6 wherein $R^2$ is represented by the formula:

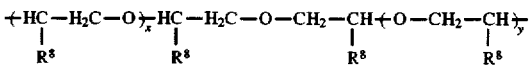

wherein $R^8$ is independently hydrogen or methyl and x and y are independently 0–100 and n is 0.

9. The oligomer of claim 6 wherein $R^2$ is m-phenylene, p-phenylene, naphthylene, diphenylene-isopropylidene, sulfonyldiphenylene, carbonyldiphenylene, oxydiphenylene or 9,9-fluorenediphenylene.

10. The oligomer of claim 1 wherein $R^6$ is independently, and optionally substituted with at least on hydroxyl group, alkylene, cycloalkylene, alkylenearylene, alkyleneoxyalkylene, poly(alkyleneoxyalkylene), alkyleneamidealkylene, poly(alkyleneamidealkylene), alkylenethioalkylene, poly(alkylenethioalkylene), alkylenesulfonylalkylene, poly (alkylenesulfonylalkylene), arylene, dialkylenearylene, diaryleneketone, diarylenesulfone, diarylene oxide, alkylidene-diarylene, diarylene sulfide, or a combination of these moieties.

11. The oligomer of claim 10 wherein $R^6$ is independently ethylene, propylene, butylene, pentamethylene, hexamethylene, heptamethylene, octamethylene, 1,4-cyclohexylene, 1,3-cyclohexylene or 1,2-cyclohexylene, optionally substituted with at least one hydroxyl group.

12. The oligomer of claim 10 wherein $R^6$ is represented by the formula:

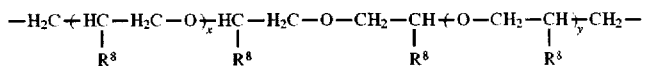

wherein $R^8$ is independently hydrogen or methyl and x and y are independently 0–100.

13. The oligomer of claim 10 wherein $R^6$ is independently m-phenylene, p-phenylene or 2,6-napthalene.

14. The oligomer of claim 1 wherein $R^5$ is hydrogen.

15. The oligomer of claim 1 wherein n is 0–10.

16. The oligomer of claim 1 in the form of a thermosetting resin which upon heating yields a cross-linked product.

17. The oligomer of claim 1 formed by the reaction of bisphenol A-diglycidyl ether with adipic acid, malic acid, tartaric acid, terephthalic acid, isophthalic acid or a dimerized fatty acid.

18. The oligomer of claim 1 in the form of an adhesive.

19. The oligomer of claim 1 in the form of a coating.

* * * * *